United States Patent
Kobata

(10) Patent No.: US 9,981,623 B2
(45) Date of Patent: May 29, 2018

(54) OCCUPANT RESTRAINT SYSTEM FOR VEHICLE

(71) Applicant: HONDA MOTOR CO., LTD., Tokyo (JP)

(72) Inventor: Seiji Kobata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/241,850

(22) Filed: Aug. 19, 2016

(65) Prior Publication Data

US 2017/0050601 A1   Feb. 23, 2017

(30) Foreign Application Priority Data

Aug. 21, 2015   (JP) ................. 2015-163722

(51) Int. Cl.
*B60R 21/18* (2006.01)
(52) U.S. Cl.
CPC .................... *B60R 21/18* (2013.01)
(58) Field of Classification Search
CPC ....................................... B60R 21/18
USPC ........................................... 280/733
See application file for complete search history.

(56) References Cited

U.S. PATENT DOCUMENTS

| | | | | |
|---|---|---|---|---|
| 5,642,902 A * | 7/1997 | France | ............. | B60R 21/18 137/38 |
| 5,863,065 A * | 1/1999 | Boydston | ............. | B60R 21/01 280/730.1 |
| 6,082,763 A * | 7/2000 | Kokeguchi | ............. | B60R 21/18 280/733 |
| 6,237,945 B1 * | 5/2001 | Aboud | ............. | B60R 21/18 280/730.2 |
| 6,352,282 B2 * | 3/2002 | Hirose | ............. | B60R 21/18 280/733 |
| 6,382,666 B1 * | 5/2002 | Devonport | ............. | B60R 21/18 280/730.1 |
| 6,511,093 B2 * | 1/2003 | Buerkle | ............. | B60R 21/23138 280/729 |
| 8,308,190 B2 * | 11/2012 | Smith | ............. | B60R 21/18 280/733 |
| 8,317,222 B2 * | 11/2012 | Arnold | ............. | B60R 21/18 180/268 |
| 8,480,127 B2 * | 7/2013 | Rathmann-Ramlow | ............. | B60R 21/18 280/733 |
| 9,221,415 B2 * | 12/2015 | Sundararajan | ............. | B29D 22/02 |
| 9,346,430 B2 * | 5/2016 | Wang | ............. | B60R 21/18 |

(Continued)

FOREIGN PATENT DOCUMENTS

EP          592815 A1 *   4/1994   ............. B60R 21/18
JP      2015-51744 A       3/2015

*Primary Examiner* — Faye M Fleming
(74) *Attorney, Agent, or Firm* — Westerman, Hattori, Daniels & Adrian, LLP

(57) ABSTRACT

An occupant restraint system 1 includes a seatbelt device 3 having a webbing 5 that is designed to extend obliquely across an occupant, seated on a seat, so as to pass through a shoulder part located on one side in a lateral direction and a part in front of a waist part located on the other side, and thereby to restrain an upper body of the occupant. The occupant restraint system 1 also includes an airbag device 4 having a bag body 10 that is installed on the webbing 5 in a folded state and designed to expand and deploy upon input of an impact load and thereby to restrain a periphery of a neck part of the occupant.

4 Claims, 7 Drawing Sheets

(56) References Cited

U.S. PATENT DOCUMENTS

2002/0171233 A1* 11/2002 Grace .................... B60R 21/18
                                                                280/733
2016/0244173 A1* 8/2016 Deevey ................. D06M 11/00
2016/0280171 A1* 9/2016 Moeller ............... B60R 21/207

* cited by examiner

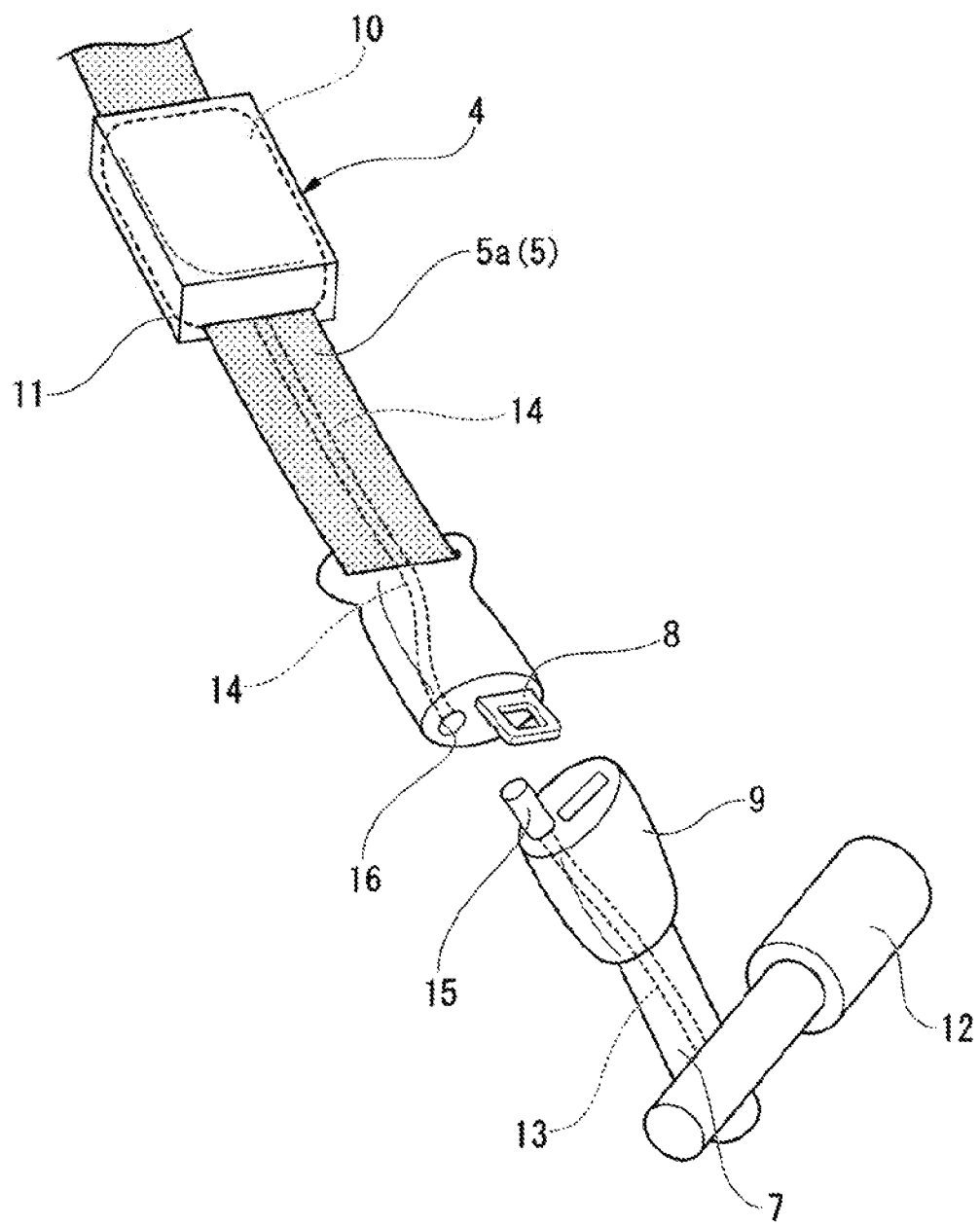

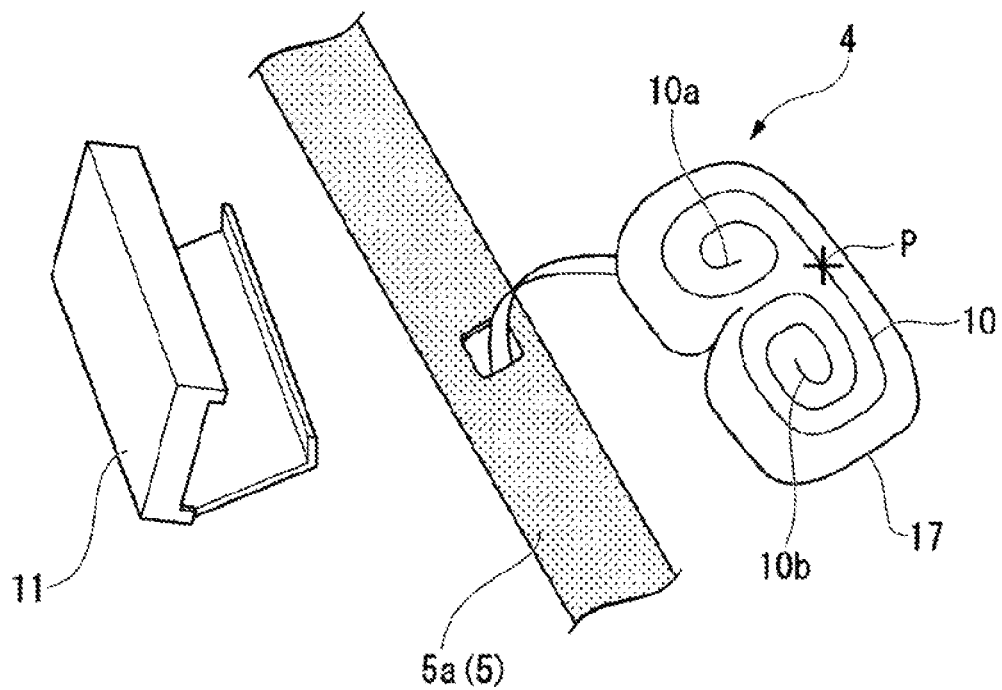

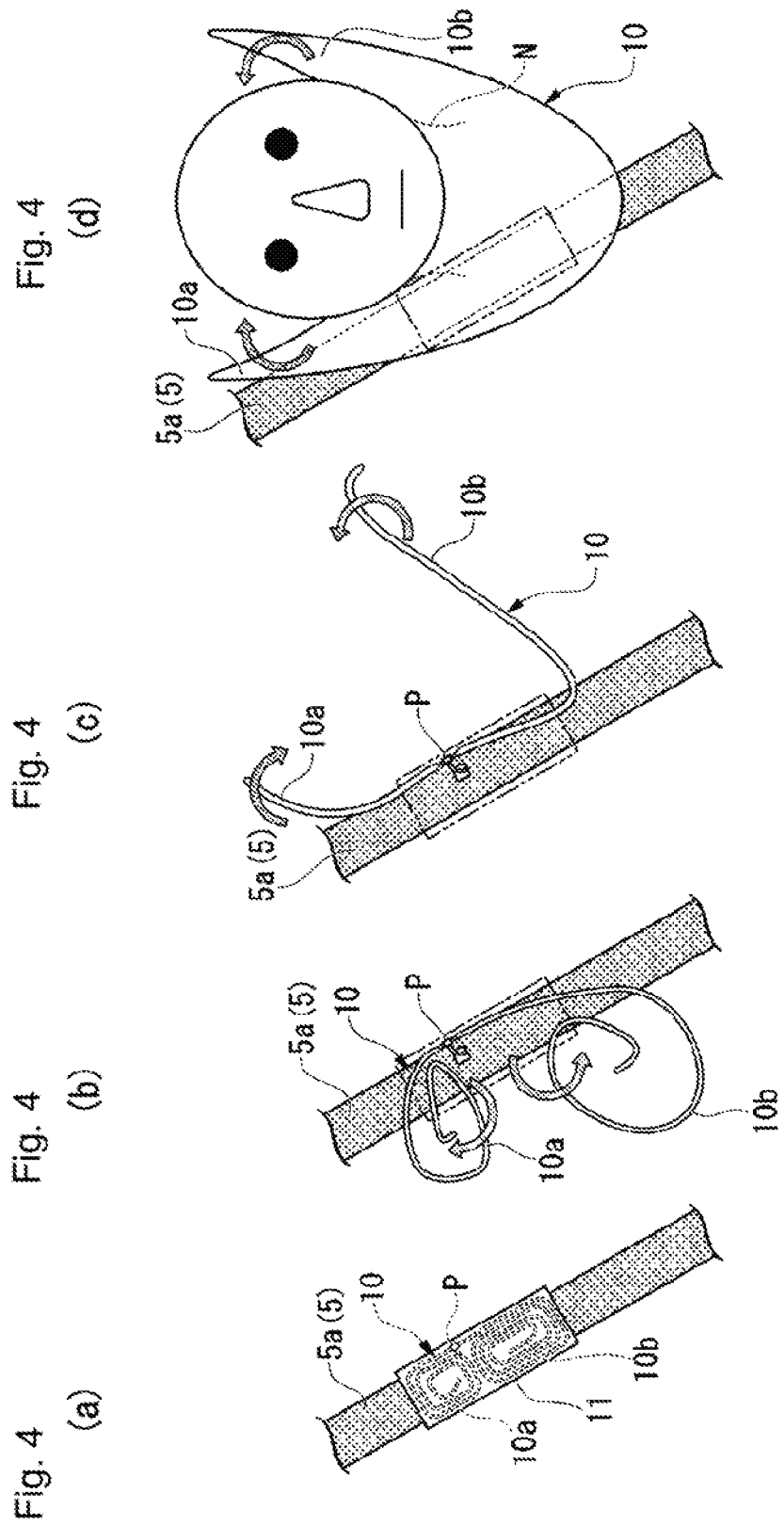

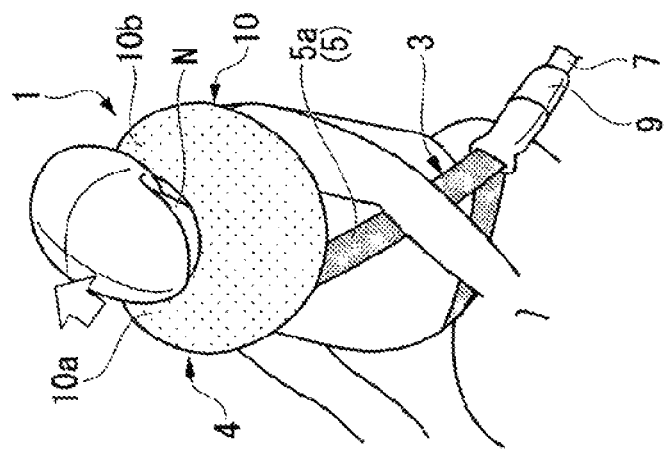
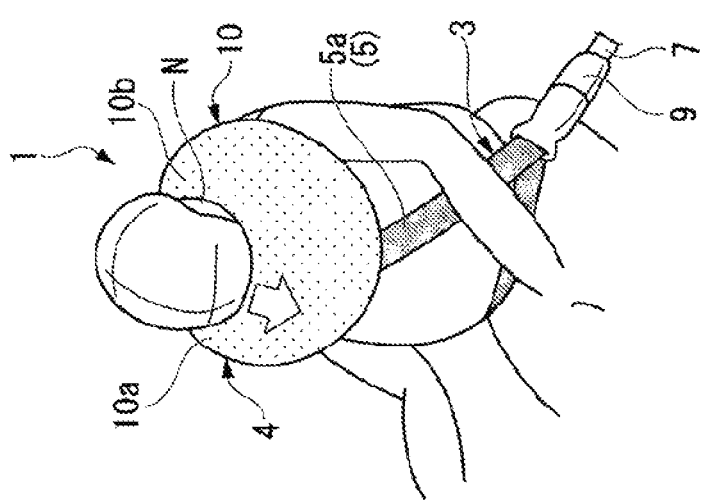
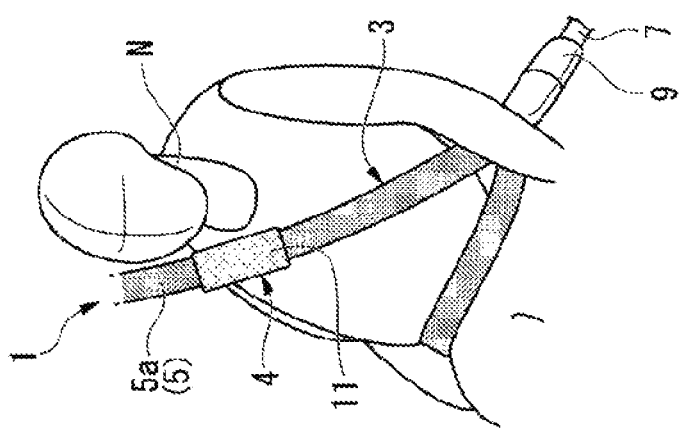

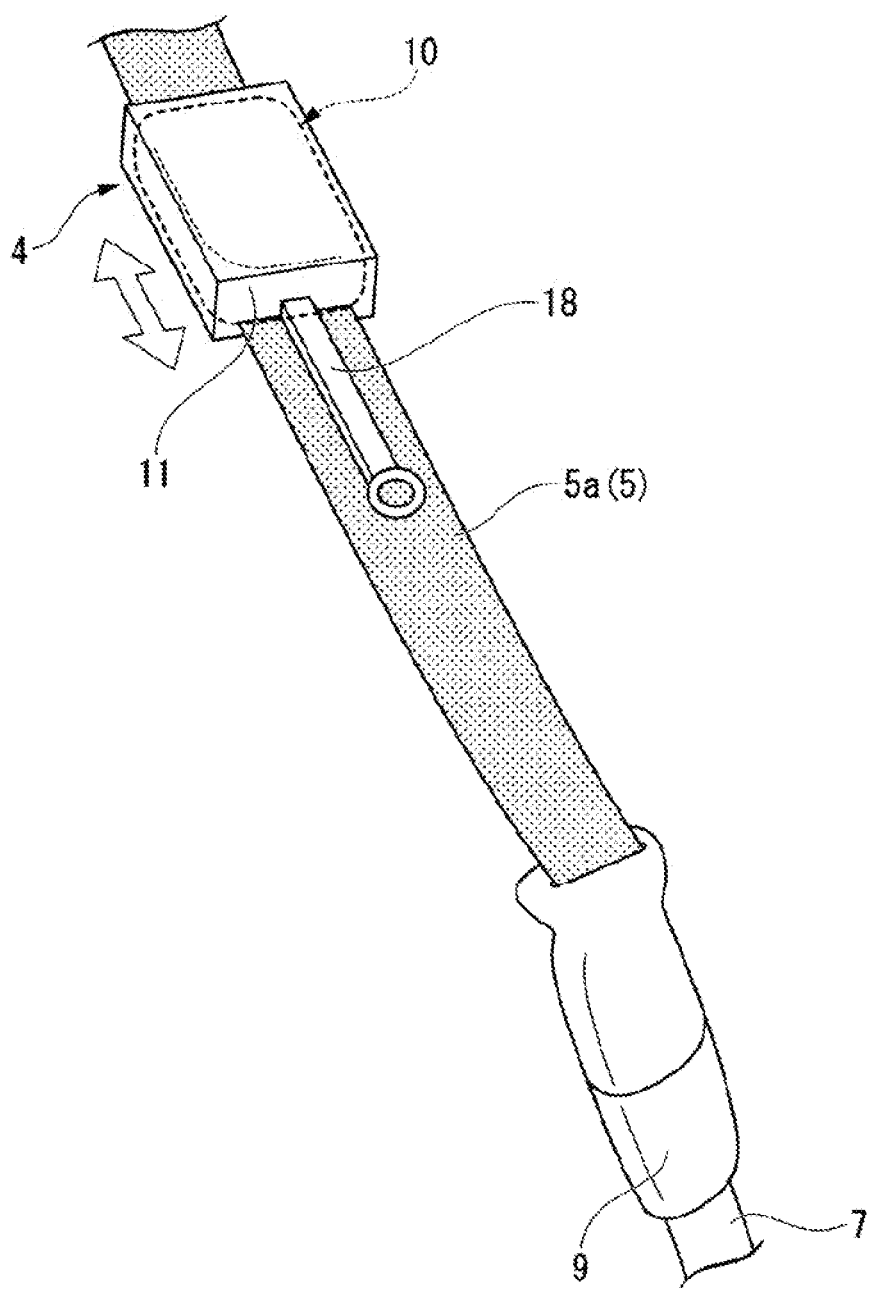

OCCUPANT RESTRAINT SYSTEM FOR VEHICLE

CROSS-REFERENCE OF RELATED APPLICATION

This application claims priority of Japanese Patent Application No. 2015-163722 filed in Japan on Aug. 21, 2015, the entire contents of which are incorporated herein by reference.

TECHNICAL FIELD

This invention relates to an occupant restraint system for a vehicle configured to protect an occupant seated on a seat upon input of an impact load.

BACKGROUND OF THE INVENTION

Airbag devices and seat-belt devices are known as an occupant protection system configured to protect an occupant seated on a seat upon input of an impact load. These airbag devices and seatbelt devices are ones for regulating the movement of the upper body of an occupant upon input of an impact load; at this time, it is particularly crucial to stably restrict the movement of a head part and a neck part of the occupant. Thus, various occupant restraint systems for dealing with this have been devised (see Japanese Patent Application Publication No. 2015-51744, for example).

The occupant restraint system described in Japanese Patent Application Publication No. 2015-51744 has a bag body of an airbag device that is embedded in a lap belt part of a seatbelt device designed to restrain a waist part of an occupant, and is designed so that the bag body expands and deploys from the lap belt part upon input of an impact load. In addition, the bag body includes: a lower bag part for restraining a chest part and an abdominal part; and an upper bag part, for restraining a head part. After the lower bag part expands and deploys, the upper bag part deploys and restrains the movement of the head part of the occupant.

The existing occupant restraint system described above can restrict the forward movement of the head part of the occupant upon input of an impact load by the expansion and deployment of the upper bag part; however, it is hard for the upper bag part to directly contact with the neck part of the occupant upon input of the impact load. Hence, it has been demanded to restrain the neck part of the occupant stably.

SUMMARY OF INVENTION

Thus, this invention has been made to provide an occupant restraint system for a vehicle capable of restraining a neck part of an occupant more stably upon input of an impact load.

In order to solve the above problem, an occupant restraint, system according to this invention includes: a seatbelt device (a seatbelt device 3 of an embodiment, for example) having a webbing (a webbing 5 of the embodiment, for example) that is designed to extend obliquely across an occupant, seated on a seat, so as to pass through a shoulder part located on one side in a lateral direction and a part in front of a waist part located on the other side, and thereby to restrain an upper body of the occupant; and an airbag device (an airbag device 4 of the embodiment, for example) having a bag body (a bag body 10 of the embodiment, for example) that is installed on the webbing in a folded state and designed to expand and deploy upon input of an impact load and thereby to restrain a periphery of a neck part of the occupant.

With the above configuration, upon input of an impact load, the bag body disposed on the webbing expands and deploys around the neck part of the occupant. Thereby, even if a head part of the occupant is waggled back and forth or from side to side, the periphery of the neck part of the occupant is directly restrained by the bag body.

The system may be configured so that, the bag body has a shape expandable and deployable in a substantially arc-shaped form that covers the periphery of the neck part of the occupant.

In this case, it becomes easier for the bag body to deploy so as to cover the periphery of the neck part of the occupant upon input of an impact load.

The system may be configured so that the bag body is wound, on a side opposite a side where the neck part of the occupant is located, with an axis substantially orthogonal to a direction the webbing extends as an axis or a shaft member (an axis p of the embodiment, for example), and expands and deploys about the axis upon introduction of gas thereinto so as to wind around the neck part of the occupant.

In this case, when gas is introduced into the bag body upon input of an impact load, the bag body is released from its folded state along arcs about the axis. This behavior makes it easier for the bag body to deploy so as to cover the periphery of the neck part of the occupant.

The system may be configured so that the bag body is housed in an openable airbag case (an airbag case 11 of the embodiment, for example), the airbag case is held together with the bag body so as to be capable of positional adjustment with respect to the webbing, and an adjustment position check scale (an adjustment position check scale 18 of the embodiment, for example) is provided in the airbag case.

In this case, the occupant can correctly adjust the position of the airbag case with respect to the occupant while checking its position with the adjustment position check scale.

The system may be configured so that a tongue plate (a tongue plate 8 of the embodiment, for example) designed to be detachably coupled to a body-side anchor belt (an anchor belt 7 of the embodiment, for example) near the waist part of the occupant seated on the seat is fixed on the webbing.

In this case, when the position of the bag body on the webbing is constant, the distance from the tongue plate to the bag body becomes constant. Thus, it becomes easier to make the fixation position of the bag body versatile irrespective of which occupant, whose physique varies from one person to another, wears the seatbelt device. Thereby, even when the position of the bag body is made unadjustable according to need, the periphery of a neck part of an occupant whose physique varies from one person to another can be restrained by the bag body.

According to this invention, a bag body disposed on a webbing expands and deploys upon input of an impact load and thereby restrains the periphery of a neck part of an occupant, whereby the neck part of the occupant can be directly restrained more stably.

BRIEF DESCRIPTION OF THE DRAWINGS

FIG. 2 is a perspective view of a part of the occupant restraint system according to the embodiment of this invention.

FIG. 3 is an exploded perspective view of a part of the occupant restraint system according to the embodiment of this invention.

FIGS. 4(a) to 4(d) are schematic front views illustrating the behaviors of the occupant restraint system according to the embodiment of this invention.

FIGS. 5(a) to 5(c) are perspective views illustrating the states of the occupant restraint system according to the embodiment of this invention before and after activation.

FIG. 6 is a perspective view of a part of an occupant restraint system according to another embodiment of this invention.

DETAILED DESCRIPTION OF THE INVENTION

Hereinbelow, an embodiment of this invention is described based on the drawings.

Figure 1:
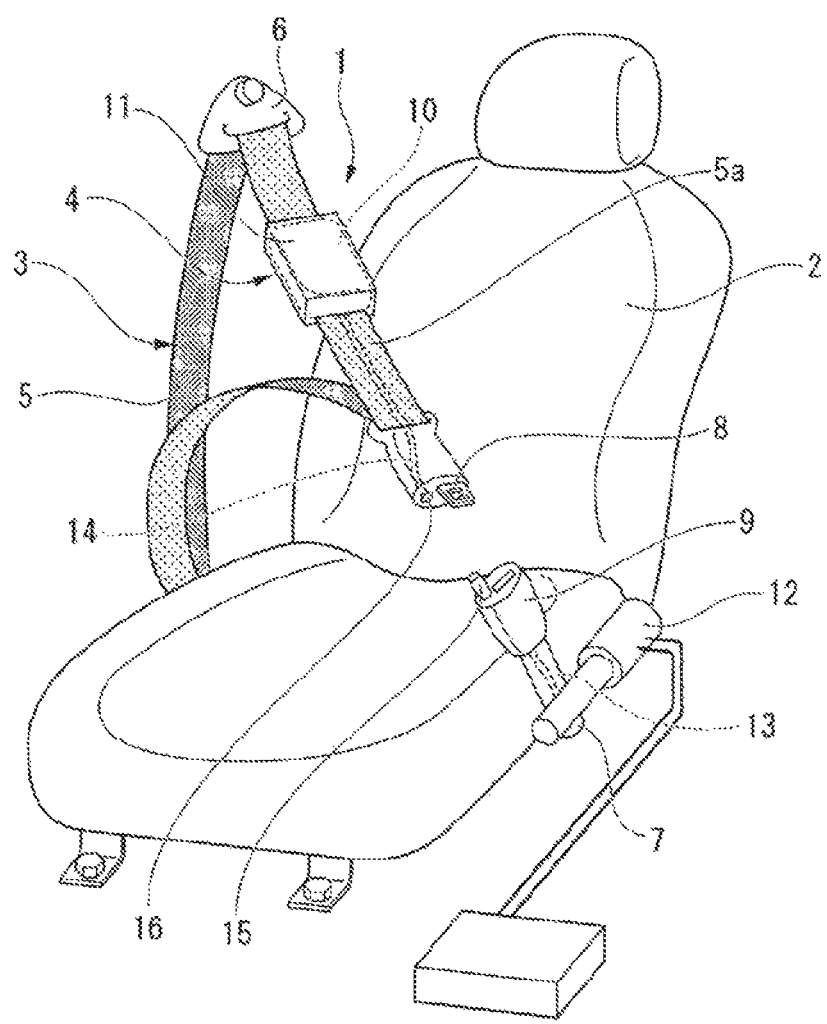
FIG. 1 is a perspective view of an occupant restraint system according to an embodiment of this invention.

FIG. 1 is a view illustrating a schematic configuration of an occupant restraint system 1 for a vehicle according to this embodiment. The occupant restraint system 1 includes: a three point type seatbelt device 3 that is configured to restrain an occupant, seated on a seat 2, on the seat 2 at a shoulder part located on an outer side in a vehicle widthwise direction (one side in a lateral direction) and a waist part on both left and right sides thereof; and an airbag device 4 that is configured to restrain the periphery of a neck part of the occupant seated on the seat 2 upon input of an impact load.

In the seatbelt device 3, a webbing 5 has an elongated body with a generally-flat surface and is drawn out upward from a retractor (not illustrated) attached to a center pillar, the webbing 5 is inserted in a through anchor 6 supported on an upper side of the center pillar, and the tip of the webbing 5 is fixed on a body floor via an outer anchor (not illustrated) located on a part of the seat 2 close to an outer side of a vehicle compartment. Further, a tongue plate 8 is inserted in the webbing 5 in an area between the through anchor 6 and the outer anchor, and the tongue plate 8 is attachable to and detachable from a buckle 9 that is fixed on the body floor at a position close to an inner side of the seat 2 with respect to a vehicle body. The buckle 9 is fixed on the body floor via an anchor belt 7.

The webbing 5 is retracted by the retractor in its initial state, and restrains mainly a chest part and an abdominal part of an occupant on the seat 2 once the occupant draws it out by hand and fixes the tongue plate 8 on the buckle 9. Note that another airbag device (not illustrated) configured to restrain the upper body of an occupant upon input of an impact load is installed on a steering wheel (not illustrated) and an instrument panel (not illustrated) located at a front side of the seat 2. This airbag device employs a known structure, and thus this airbag device will not be described in detail.

On the webbing 5 in a portion extend obliquely across the occupant so as to pass through the shoulder part located on the outer side in the vehicle widthwise direction and a part in front of the waist part located on the inner side in the vehicle widthwise direction when the occupant wears the seatbelt device (such a portion is hereinafter referred to as a "shoulder belt part 5a"), a bag body 10 of the airbag device 4 is held together with an airbag case 11. The bag body 10 and the airbag case 11 are held in the shoulder belt part 5a at a position placed substantially in front of the chest part of the occupant seated on the seat 2.

FIG. 2 is an enlarged view of a joint area between the buckle 9 and the tongue plate 8 held by the shoulder belt part 5a, and FIG. 3 is an exploded view of a part on the shoulder belt part 5a where the bag body 10 of the airbag device 4 is attached.

The seatbelt device 3 includes: the bag body 10 that is disposed in the airbag case 11 in a folded state; and an inflator 12 that is configured to expand and deploy the bag body 10 upon input of an impact load by feeding the bag body 10 with high pressure gas. The inflator 12 is disposed on the body floor or on the seat 2. The inflator 12 and the bag body 10 are capable of being connected to each other via a buckle-side gas passage 13 provided in the buckle 9 and a belt-side gas passage 14 provided in the shoulder belt part 5a. The buckle-side gas passage 13 and the belt-side gas passage 14 are connected to each other simultaneously with the connection between the buckle 9 and the tongue plate 8, via joints 15, 16 respectively provided in the buckle 9 and in a part holding the tongue plate 8.

FIGS. 4(a) to 4(d) are views illustrating the deployment behaviors of the bag body 10 upon activation of the airbag device 4 sequentially in the order from (a) to (d), and FIGS. 5(a) to 5(c) are views illustrating the state (a) of the airbag device 4 before activation and the states (b), (c) of the airbag device 4 after activation.

As illustrated in FIGS. 4(d), 5(b), and 5(c), the bag body 10 has a shape expandable and deployable in a substantially arc-shaped form capable of covering the periphery of a neck part N of the occupant. To be more accurate, the bag body 10 having an expandable and deployable shape is such that the sectional area of the arc is the largest at or near its central part and becomes gradually smaller toward its both ends in the direction the arc extends. In addition, the arc formed by the expanded and deployed bag body 10 is set to have an arc length such that the central angle of the arc exceeds 180°.

In addition, as illustrated in FIG. 3, the bag body 10 is folded by winding its two portions on the side opposite the side where the neck part N of the occupant seated on the seat 2 is located, in such a manner that the webbing 5 at its middle part is attached to an axis P (such as of a shaft member) which is substantially perpendicular to the belt surface of the webbing 5 (shoulder belt part 5a) and each of two elongated portions extending from the axis p is wound in a direction away from the neck part N so that the part attached to the axis P is outside the winding and each of the ends is inside the winding. Specifically, the bag body 10 is supported on the webbing 5 via the airbag case 11 with a substantially central part of the bag body 10 in the longitudinal direction thereof serving as the axis p. Moreover, edge parts 10a, 10b on both sides of the bag body 10 in the longitudinal direction thereof are each folded in such a way as to be wound on the side opposite the side of the neck part N of the occupant. Here, reference numeral 17 in FIG. 3 indicates a cover member that is broken at the time of expansion and deployment of the bag body 10.

In addition, the airbag case 11 housing the folded bag body 10 therein is attached to the shoulder belt part 5a of the webbing 5 together with the bag body 10 so as to be capable of positional adjustment. The position of the airbag case 11 may be adjusted by, for example, loosening a pinch fixation part (not illustrated) of the airbag case 11 where the airbag case pinches the shoulder belt part 5a, adjusting the position of the airbag case 11 to a proper position, and then tightening the pinch fixation part again. The structure of the position adjustment mechanism of the airbag case 11 is not limited thereto and any other structure may be employed instead.

Alternatively, as in another embodiment illustrated in FIG. 6, an adjustment position check scale 18 may be provided between the webbing 5 (shoulder belt part 5a) and the airbag case 11 so that an occupant adjusting the position of the airbag case 11 and the bag body 10 can check the correct position of the airbag case 11.

In the occupant restraint system 1 according to this embodiment, when an impact load is input to the vehicle in a state where an occupant seated on the seat 2 wears the seatbelt device 3, gas generated in the inflator 12 passes through the inside of the webbing 5 (shoulder belt part 5a) and is fed to the bag body 10. Once high pressure gas is fed to the bag body 10 in this manner, the bag body 10 starts expanding and deploying and opens the airbag case 11 and, as illustrated in FIGS. 4(b) and 4(c), the edge parts 10a, 10b on both sides of the bag body 10 are released from being wound along arcs about the axis p. Then, as the edge parts 10a, 10b on both sides of the bag body 10 are kept, charged with gas after they are released along the arcs, the edge parts 10a, 10b on both sides of the bag body 10 expand to go around the neck part N of the occupant, as illustrated in FIG. 4(d).

As a result, the bag body 10 having expanded is placed to go around the neck part N of the occupant, whereby the periphery of the neck part N of the occupant, is directly restrained by the bag body 10.

Specifically, for example, when an impact load is input from ahead of the vehicle and the neck part N of the occupant is about to be bent, forward at an initial stage of the input of this load, as illustrated in FIG. 5(b), a front, area of the neck part N and a jaw part are directly supported by a central area of the bag body in the longitudinal direction thereof. Moreover, when the neck part N of the occupant is about to be leaned rearward by rebound at a later stage of the input of the impact load, as illustrated in FIG. 5(c), a rear area of the neck part N is directly supported by the edge parts 10a, 10b on both sides of the bag body 10 in the longitudinal direction thereof. Further, when the neck part N of the occupant is waggled from side to side by the input of the impact load, left and right areas of the neck part N are directly supported by the edge parts 10a, 10b on both sides of the bag body 10 in the longitudinal direction thereof.

As described above, in the occupant restraint system 1 according to this embodiment, the bag body 10 disposed on the shoulder belt part 5a of the webbing 5 expands and deploys upon input of an impact load and thereby directly restrains the periphery of the neck part N of an occupant. Thereby, the neck part N of the occupant can be restrained stably.

In particular, in the occupant restraint system 1 according to this embodiment, the bag body 10 has a shape expandable and deployable in a substantially arc-shaped form so as to cover the periphery of the neck part N of the occupant. Thereby, upon input of an impact load, the periphery of the neck part N of the occupant can be restrained by the bag body 10 more reliably.

In addition, in the occupant restraint system 1 according to this embodiment, the bag body 10 is folded in such a way that, on the side opposite the side where the neck part N of the occupant is located, it is wound with the axis substantially orthogonal to the direction the shoulder belt part 5a of the webbing 5 extends as the axis p. Hence, when high pressure gas is introduced into the bag body 10, the bag body 10 is released from its folded state along the arcs about the axis p. Thereby, a combination of the behavior of the bag body 10 when released and the expansion of the bag body 10 following this behavior enables the bag body 10 to expand so as to wind around the neck part N of the occupant more reliably.

Further, if the airbag case 11 is attached to the shoulder belt part 5a of the webbing 5 together with the bag body 10 so as to be capable of positional adjustment and the adjustment position check scale 18 is provided in the airbag case 11 as in the embodiment illustrated in FIG. 6, the occupant can correctly adjust the position of the airbag case 11 and the bag body 10 with respect to the occupant while checking their position with the adjustment position check scale 18.

Figure 7:
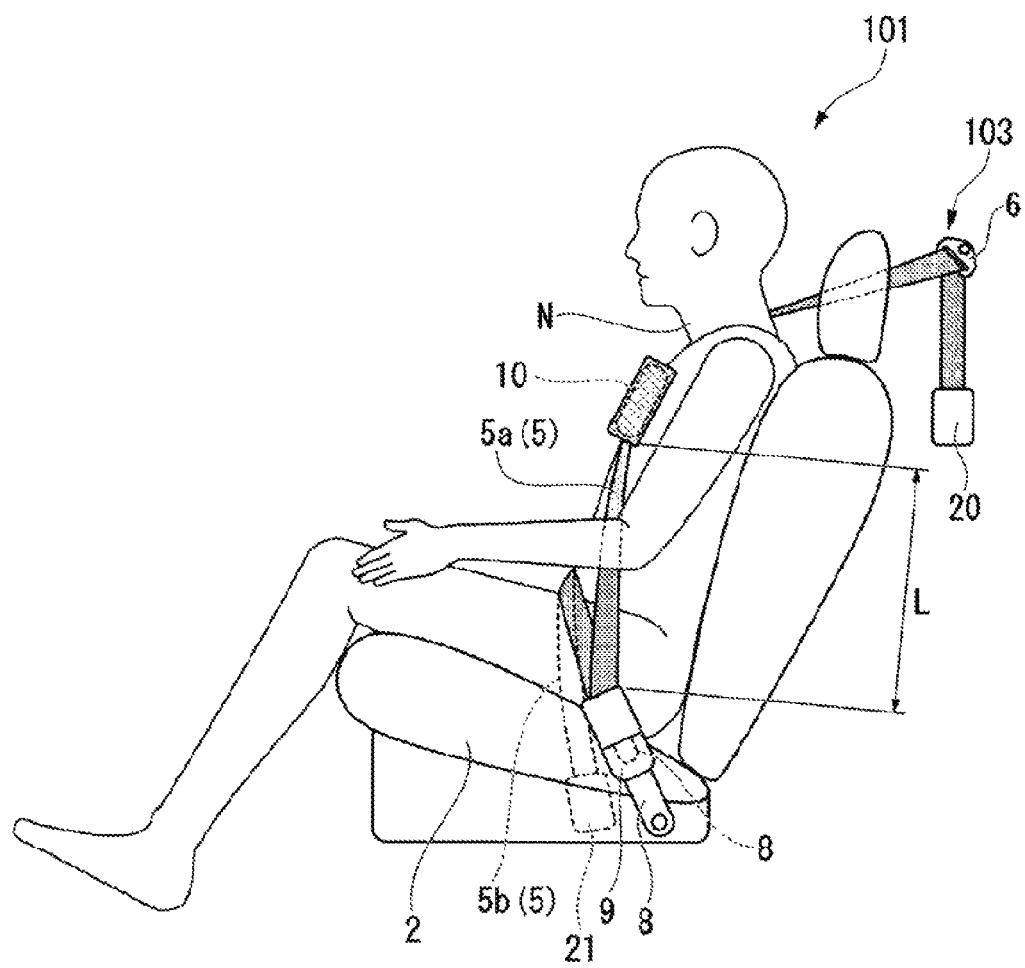
FIG. 7 is a side view illustrating an occupant restraint system according to still another embodiment of this invention.

FIG. 7 is a view illustrating an occupant restraint system 101 according to still another embodiment of this invention.

As in the case of the above embodiment, the occupant restraint system 101 according to this embodiment includes a seatbelt device 103, and the bag body 10 of the airbag device 4 is attached to the shoulder belt part 5a of the seatbelt device 103. In the case of this occupant restraint system 101, the tongue plate 8 designed to be detachably coupled to the anchor belt 7 via the buckle 9 is unslidably fixed on the lower end of the shoulder belt part 5a. In addition, the bag body 10 and the airbag case 11 are attached on the shoulder belt part 5a so as to be incapable of positional adjustment. In this occupant restraint system 101, the position of the bag body 10 and the airbag case 11 is unadjustable; however, because the position of the tongue plate 8 is fixed at the lower end of the shoulder belt part 5a, a distance L from the anchor belt 7 to the bag body 10 and the airbag case 11 is always constant irrespective of the physique of an occupant to use this system. Accordingly, although the physique of an occupant varies from one person to another, the distance from the part where the bag body 10 is attached to the neck part N of the occupant never changes largely. Thus, even if the position of the bag body 10 and the airbag case 11 is unadjustable, the bag body 10 can restrain the periphery of the neck part N of an occupant whose physique varies from one person to another. In this respect, the bag body 10 and the airbag case 11 may be installed on the shoulder belt part 5a so as to be capable of positional adjustment.

In addition, in the occupant restraint system 101 according to this embodiment, one end of the shoulder belt part 5a of the seatbelt device 103 is coupled to a first retractor 20, and one end of a lap belt part 5b designed to restrain a waist part and a thigh part of the occupant is coupled to a second retractor 21. Here, the other end of the lap belt part 5b is coupled to the tongue plate 8. Accordingly, in the case of the seatbelt device 103 employed here, how long the shoulder belt part 5a and the lap belt part 5b are drawn out can be adjusted freely according to the physique of the occupant by means of the first retractor 20 and the second retractor 21.

Note that this invention is not limited to the foregoing embodiments, and various design changes may be made without departing from the gist of the invention.

DESCRIPTION OF REFERENCE NUMERALS

1 OCCUPANT RESTRAINT SYSTEM
3 SEATBELT DEVICE
4 AIRBAG DEVICE
5 WEBBING
7 ANCHOR BELT
8 TONGUE PLATE
10 BAG BODY
11 AIRBAG CASE
18 ADJUSTMENT POSITION CHECK SCALE
p AXIS

The invention claimed is:

1. An occupant restraint system for a vehicle, comprising:
a seat of a vehicle on which an occupant is to be seated;
a seatbelt device installed in the vehicle and having a webbing that is configured to, when the occupant is on the seat, extend from an upper side in a vicinity of one side of an occupant's shoulder to a lower side in a vicinity of the other side of an occupant's waist and obliquely across an upper body of said occupant so as to restrain the upper body; and
an airbag device having a bag body in a folded state and attached to said webbing at such a position that the airbag device is in a vicinity of a neck of said occupant when the webbing restrains the upper body of said occupant, the bag body being configured to, upon input of an impact load, expand and deploy to a periphery of the neck of said occupant, thereby restraining at least a front side, a left side and a right side of the neck, wherein
said airbag device has an axis to which said bag body is attached, the axis being substantially orthogonal to a direction in which said webbing extends, and
said bag body has an elongated body which extends from the axis and is folded by winding on a side opposite to the neck of said occupant with respect to the axis so as to allow said bag body to expand and deploy about said axis upon introduction of gas thereinto in a manner that unwinds from the folded state and then winds around the neck of said occupant.

2. The occupant-restraint system for a vehicle according to claim 1, wherein said bag body is configured to form a substantially arc-shaped bag body that covers the periphery of the neck part of said occupant when expanded and deployed.

3. An occupant restraint system for a vehicle, comprising:
a seat of a vehicle on which an occupant is to be seated;
a seatbelt device installed in the vehicle and having a webbing that is configured to, when the occupant is on the seat, extend from an upper side in a vicinity of one side of an occupant's shoulder to a lower side in a vicinity of the other side of an occupant's waist and obliquely across an upper body of said occupant so as to restrain the upper body; and
an airbag device having a bag body in a folded state and attached to said webbing at such a position that the airbag device is in a vicinity of a neck of said occupant when the webbing restrains the upper body of said occupant, the bag body being configured to, upon input of an impact load, expand and deploy to a periphery of the neck of said occupant, thereby restraining at least a front side, a left side and a right side of the neck, wherein
said bag body is housed in an openable airbag case,
said airbag case is held together with said bag body so as to be capable of positional adjustment with respect to said webbing, and
an adjustment position check scale is provided in said airbag case.

4. The occupant restraint system for a vehicle according to claim 1, wherein
said webbing at an end thereof has a coupling portion configured to be detachably coupled to an anchor belt extended from a vehicle body, at a position in a vicinity of the waist of said occupant seated on said seat.

* * * * *